United States Patent [19]

Jones

[11] 3,858,450
[45] *Jan. 7, 1975

[54] SAMPLE MIXING AND METERING APPARATUS

[75] Inventor: Alan Richardson Jones, Miami, Fla.

[73] Assignee: Coulter Electronics, Inc., Hialeah, Fla.

[*] Notice: The portion of the term of this patent subsequent to June 26, 1990, has been disclaimed.

[22] Filed: Aug. 31, 1972

[21] Appl. No.: 285,196

Related U.S. Application Data

[63] Continuation-in-part of Ser. No. 191,248, Oct. 21, 1971, Pat. No. 3,747,412, and a continuation-in-part of Ser. No. 242,576, April 10, 1972, abandoned.

[52] U.S. Cl. ............. 73/423 A, 23/259, 73/422 GC
[51] Int. Cl. ............................................. G01n 1/10
[58] Field of Search .................... 73/423 A, 422 GC

[56] References Cited
UNITED STATES PATENTS

| | | | |
|---|---|---|---|
| 3,327,535 | 6/1967 | Sequera | 73/423 A |
| 3,376,751 | 4/1968 | Junger | 73/423 A |
| 3,419,358 | 12/1968 | Smythe et al. | 73/423 A |
| 3,479,880 | 11/1969 | Mutter et al. | 73/423 A |
| 3,489,525 | 1/1970 | Natelson | 73/423 A |
| 3,530,721 | 9/1970 | Hrdina | 73/423 A |

*Primary Examiner*—S. Clement Swisher
*Attorney, Agent, or Firm*—Silverman & Cass, Ltd.

[57] ABSTRACT

The apparatus includes a sampling head adapted to be mounted at a sample pickup station. The head includes a hollow sample pickup probe adapted to be inserted into a sample container at the sample pickup station for extracting a given amount of fluid sample from the container. The pickup probe is movable between a first or sampling position and a second or retracted position by means of an air cylinder. A valve mechanism connected to the probe is operable on movement of the probe to the sampling position for connecting the probe to a device for withdrawing fluid from the sample container through the probe. The air cylinder not only moves the probe but also, and at the same time, operates the valve mechanism. In the second position the valve mechanism effects fluid connections for mixing a given amount of the fluid sample with another fluid and for simultaneously transferring the mixture to a receptacle.

9 Claims, 10 Drawing Figures

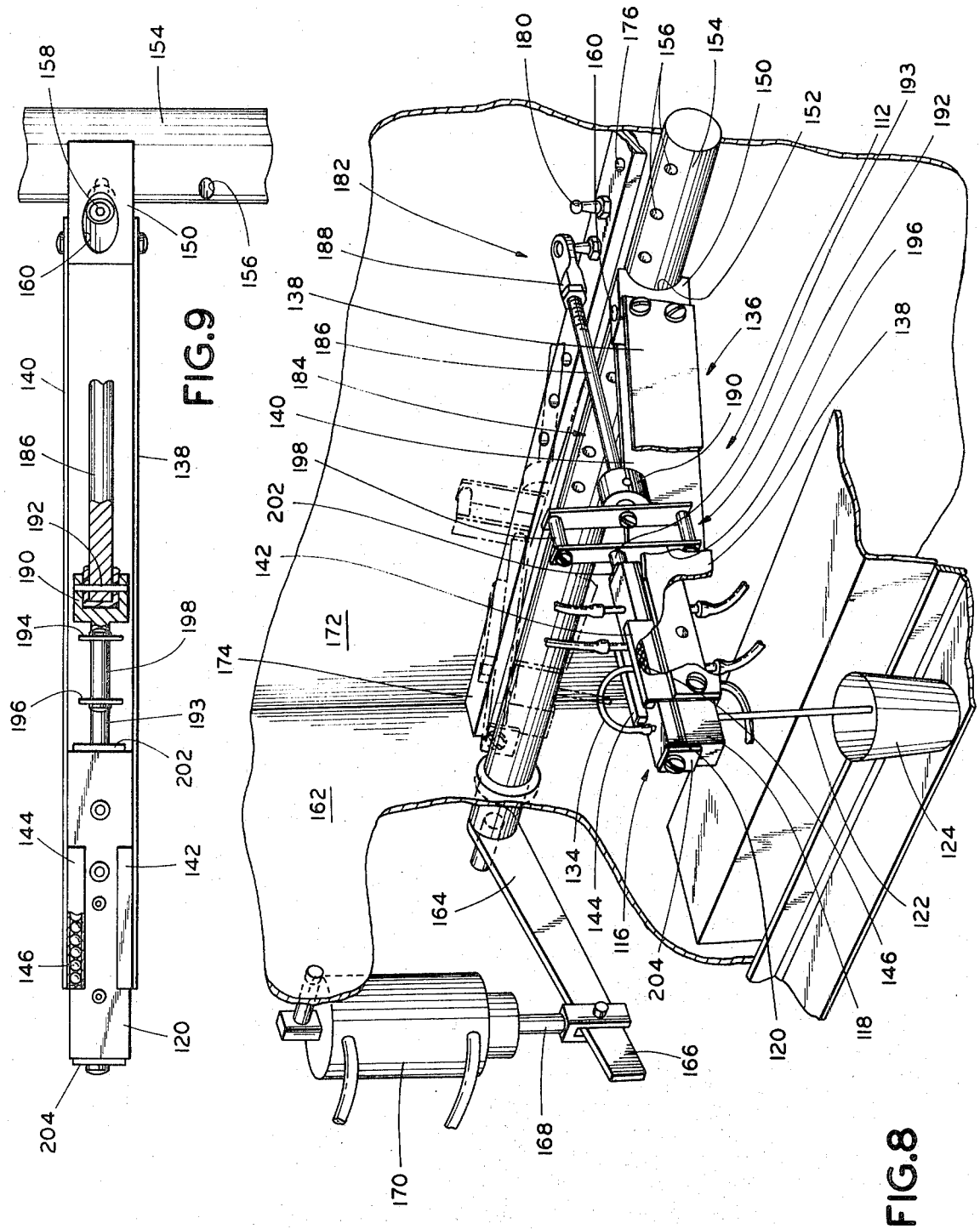

SAMPLE MIXING AND METERING APPARATUS

CROSS-REFERENCE TO RELATED APPLICATION

This application is a continuation-in-part of my co-pending U.S. application Ser. No. 191,248 filed on Oct. 21, 1971, now U.S. Pat. No. 3,747,412, and of my co-pending U.S. application Ser. No. 242,576, filed on Apr. 10, 1972, now abandoned.

BACKGROUND OF THE INVENTION

The invention herein relates to a structure for sampling and mixing liquids and delivering the mixture in a predetermined proportion to a reaction tube for testing.

In the art of automatic analysis equipment, it is normally required that a sample fluid be diluted with a second fluid in order to provide a diluted sample which is subjected to testing. In the case of particle counting and sizing apparatus, the concentrated sample may be diluted with a nonreactive diluent in order to provide a diluted sample more easily processed in the automatic counting and sizing apparatus. For example, whole blood could be diluted with a saline solution to achieve a diluted blood sample. In the case of a chemical analysis apparatus, the concentrated sample may be mixed with some liquid chemical that is to start a reaction therewith. For example, in blood chemistry apparatus, the undiluted patient's serum is diluted with different reagents to commence reactions leading to colorimetric testing of the change in absorbance of the resulting diluted sample.

Examples of known devices for picking up a sample and/or for mixing or diluting a concentrated sample are disclosed in the following U.S. Pat. Nos.

| U.S. Pat. No. | Class |
| --- | --- |
| 2,757,541 | 73 - 422 |
| 2,867,355 | 222 - 136 |
| 3,291,347 | 222 - 136 |
| 3,549,994 | 324 - 71 |
| 3,567,389 | 23 - 253 |
| 3,635,094 | 73 - 423A |

In all cases of sampling and mixing, there are certain requirements that must be met. The concentrated sample has to be withdrawn from a body of such sample and a specific volume thereof measured and isolated. The diluting fluid or reagent must be supplied in a predetermined volume so that the proportions of sample to diluent are known. The two liquids must be mixed. The mixture must then be delivered to a location where the diluted sample can be received in a suitable receptacle in which it will be tested.

Accurate measurement and thorough mixing are essential. In addition, the minimum of contamination must be effected between the processing of different samples.

All of the above comprise problems which the invention herein is intended to solve in a highly effective manner. In addition, however, the apparatus of the invention provides functions which render structure embodying the invention considerably more useful than sampling and mixing devices heretofore known.

In automatic analysis equipment which is intended to process a large number of samples continuously, the samples have to be introduced into the system of the apparatus in one way or another. The introduction of samples manually is known, the cups or vials containing the samples being moved into sample withdrawing position by the operator. The equipment could have a probe, for example, and the operator brings the cup under the probe and moves it vertically to cause the probe to dip into the sample. The operator must then have the skill and knowledge to recognize when the equipment is ready for another sample and he then manually feeds that sample to the probe.

The use of turntables is also known in automatic analysis equipment wherein the samples are disposed in consecutive cups along the periphery of the turntable. The turntable moves in steps to a sample withdrawing station and a probe at this station dips down into the cups one after the other with intervening aspiration of diluent and air to separate the samples moving along a single conduit by means of alternating volumes of diluent and bubbles.

Other methods for withdrawing the samples from their cups are also known.

The invention herein includes a structure which not only performs the withdrawing and mixing and delivering functions, but as well performs two functions which enable considerable automation to be built into automatic analysis equipment which uses structures constructed according to the invention. These two functions comprise the physical movements causing the dipping of the aspirating probe into the sample and the removal of it from the sample. According to the invention, certain passageways and ports are connected and disconnected during these two movements which make the apparatus very simple and effective and enable operation with a minimum of attendance and manual movement of the operator.

The automatic analysis equipment with which the structures of the invention are intended to be used includes a plurality of sample cups spaced apart along a path of movement which, while preferably rectilinear, may be arcuate or circular. There is a plurality of sample aspirating, mixing and delivering devices (often hereinafter called "sampling or sample heads") which are located along the path at predetermined positions and which are constructed in accordance with the teachings of the present invention.

SUMMARY OF THE INVENTION

According to the invention, there is provided a sampling head for use at a sample pickup station, the head including a hollow sample pickup probe adapted to be inserted into a sample container at the sample pickup station for extracting a given amount of fluid sample from the container. The probe is movable between a first or sample position and a second or retracted position and is connected to a valve mechanism operable upon movement of the probe to the sample position for connecting the probe to a device for withdrawing fluid from the sample container through the probe. A mechanism is provided for moving the probe and simultaneously operating the valve mechanism whereby the valve mechanism is operated by the moving mechanism to connect the probe to the withdrawing means at the same time the probe is moved by the moving mechanism to the sample position.

Preferably the probe is moved out of the sample container at a maximum speed which results in a minimum pickup of sample on the exterior surface of the probe, the desired rate of speed being dependent upon the surface tension of the fluid sample.

Also, preferably, each sampling head has a connection to a diluent or reagent pump, a delivery conduit and various connections to sources of vacuum and pressure to cause the operation thereof. The valve mechanism preferably includes a pair of valve blocks which move relative to one another in face to face planar engagement by means of a suitable pneumatically operated cylinder constituting the moving mechanism which at the same time causes the probe to be dipped downwardly or raised according to the operation of a suitable control mechanism.

When a sample arrives at the sample pickup or aspirating station where one of the sampling heads is located and assuming that the analysis calls for the sample to be mixed with a diluent or a reagent, the probe dips down into the sample, sucks up a quantity of sample, and then withdraws from the cup. During these movements, the diluent or reagent is first drawn into a pump, second, mixed with a specific volume of sample and third, delivered by means of a conduit or tubing to a reaction tube apart from the sampling head. All of this is done automatically after which the sampling head is ready for the next cup to come along.

In this way, the cups are never disturbed as they are moved along their path. Also, a different head may be used for each different kind of test and a minimum of sample and diluent or reagent is wasted.

BRIEF DESCRIPTION OF THE DRAWINGS

FIG. 8 is a perspective view with portions broken away of a modified sampling head and structure for mounting a plurality of the sampling heads; and FIG. 9 is a top view with portions broken away of the sampling head shown in FIG. 8.

DESCRIPTION OF THE PREFERRED EMBODIMENT

Figure 1:
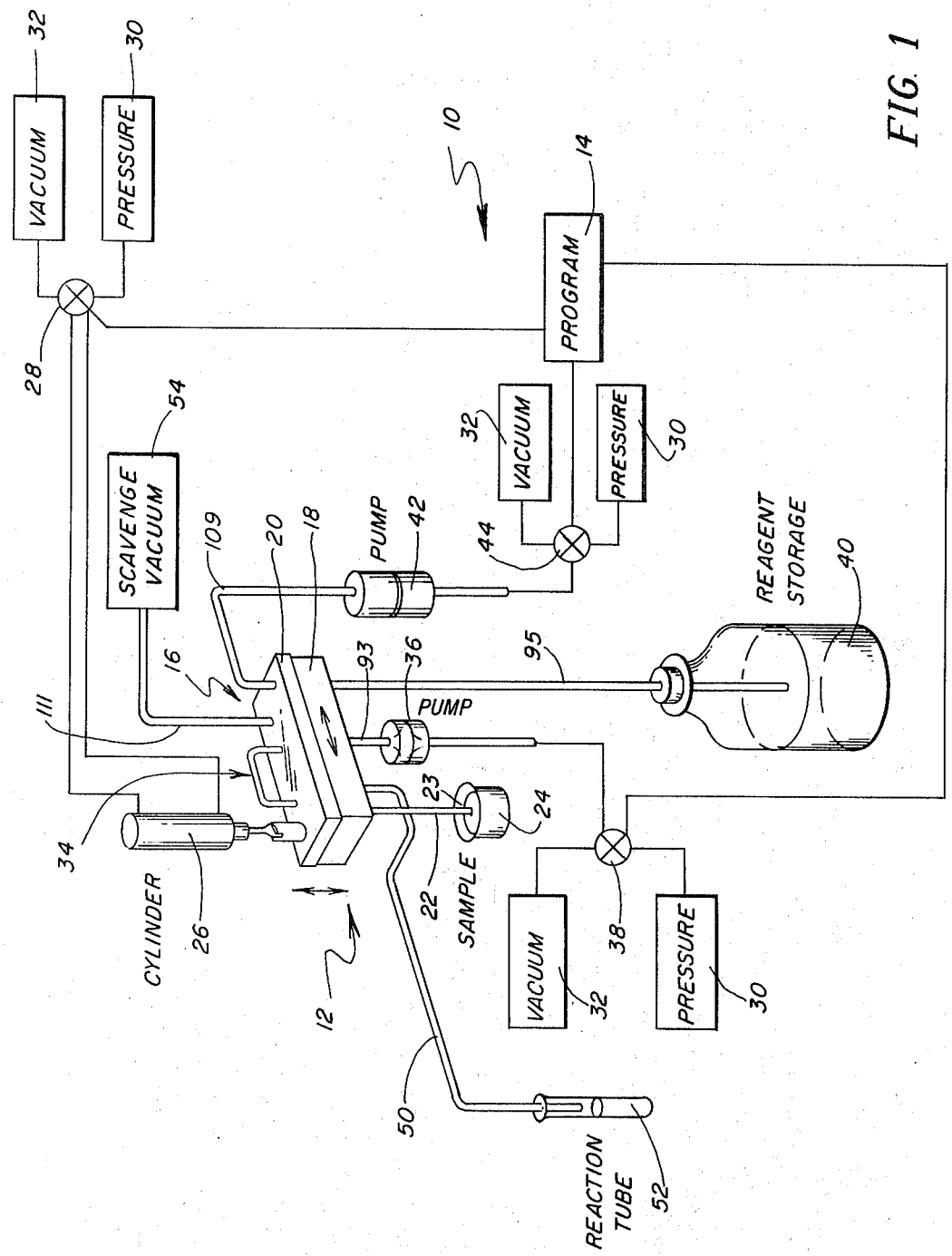
FIG. 1 is a diagrammatic view showing a system for automatically aspirating a sample, mixing it with a diluent or reagent and then depositing it in a reaction tube.

Referring now to the drawings in greater detail, the sampling and mixing apparatus of the invention is shown schematically at 10 in FIG. 1. The apparatus 10 includes a sampling head indicated generally at 12 in FIG. 1 and shown in detail in FIG. 2, and a programming device 14 for controlling the automatic operation thereof.

The sampling head 12 includes a valve mechanism 16 defined by first and second valve blocks 18 and 20 respectively, linearly movable (slidable) relative to each other between two valve positions, namely, a sampling position and a delivery position. The first block 18 has a hollow sample probe 22 extending therefrom which is movable with the sampling head 12 between a first or sampling position where the free end 23 of the probe 22 is inserted into a sample cup or container 24 and a second or retracted position out of the path of travel of the container 24. A piston and cylinder mechanism 26, preferably a pneumatically actuated cylinder, is connected to the sample head 12 for moving the probe between its two positions and for simultaneously operating the valve mechanism 16 by moving it between its two positions. The cylinder 26 is operated through a valve 28 controlled by the device 14. The valve 28 alternately connects each end of the cylinder 26 to a source 30 of pressure and a source 32 of vacuum.

In the first position of the probe 22 and the valve mechanism 16 the probe 22 is connected through the valve blocks 18 and 20 and a sample loop 34 to a sample pump 36 for withdrawing some of a liquid sample from the cup 24. The pump 36 is operated by a valve 38 connected to the sources 30 and 32 of pressure and vacuum and controlled by the device 14. In this way a given amount of sample is drawn, i.e., aspirated from the cup 24 and into the sample loop 34. At the same time, a source 40 of reagent is connected through the valve blocks 18 and 20 to a reagent pump 42 which is operated by a valve 44 connected to the sources 30 and 32 of pressure and vacuum for filling the pump 42 with a quantity of reagent. The valve 44 is also controlled by the device 14.

After a sufficient amount of sample has been drawn through the sample loop 34, the cylinder 26 is operated to move the probe out of the cup 24 and to its retracted position and at the same time to move the valve blocks 18 and 20 relative to each other. This action will shear off and trap a given amount (volume) of sample in the sample loop 34 while moving the blocks 18 and 20 to the second valve position.

When the valve mechanism 16 is in the second or delivery position, one end of the sample loop 34 is connected through the valve blocks 18 and 20 to the reagent pump 42 which is not operated by the device 14 to pump reagent therefrom into the valve blocks 18 and 20. The other end of the sample loop 34 is then connected to a conduit or tubing 50 leading to a receptacle 52, such as a reaction test tube. A shunt passage hereinafter to be described in detail shunts some of the reagent around the sample loop 34 to the outlet end of the loop 34 where it mixes with the sample being ejected from the sample loop 34 by the pressure of the reagent stream at the inlet end of the loop 34. In this way, the given amount of sample is simultaneously ejected from the sample loop 34, mixed with the reagent and delivered in a reagent-sample mixture to the reaction test tube 52. In the tube 52, the reagent reacts with the liquid sample and after a predetermined period of time the resulting mixture may be subjected to colorimetric measurements. In the case of straight dilution, the resulting mixture may be subjected to counting, etc.

At the same time, the probe 22 aned the outlet of the sample pump 36 are connected to a source of scavenge vacuum 54 for vacuum scavenging liquid sample material therefrom to prepare the apparatus 10 for taking another sample.

Figure 3:
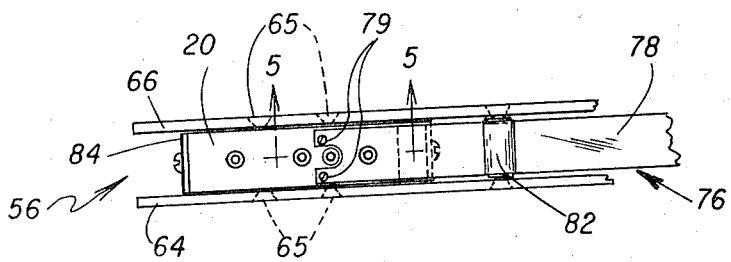
FIG. 3 is a fragmentary top plan view of the head.
Figure 2:
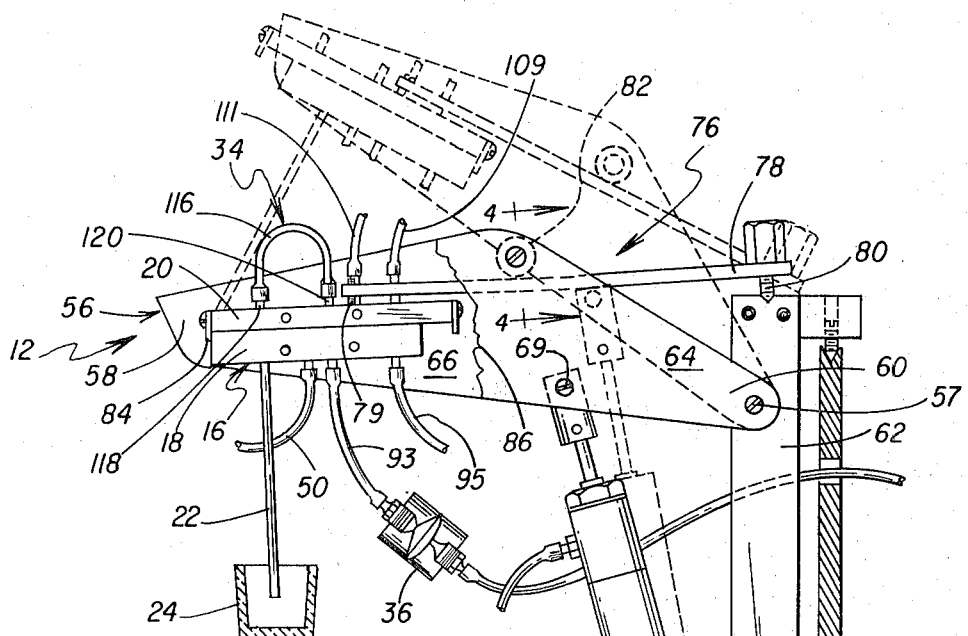
FIG. 2 is a side elevational view of the sampling head of the invention with portions broken away to show the details thereof, the head being shown in its two positions.

As shown in FIG. 2, the sampling head 12 includes an arm 56 having one end 58 mounting the valve mechanism 16 and another end 60 pivotally connected at 57 to the supporting structure or post 62. Preferably, and as shown in FIG. 3, the arm 56 includes two parallel spaced plates 64 and 66 with the valve mechanism 16 mounted therebetween. In the illustrated embodiment, the block 18 is secured to and between the plates 64 and 66 by screws 65 (FIG. 3) and the second valve block 20 is positioned between the plates 64 and 66 for slidably engaging the block 18. As a result, the plates 64 and 66 form a guideway for the block 20 and prevent lateral movement of the block 20.

The air cylinder 26 is pivotally connected at 67 to the supporting structure 62 and at 69 to the arm 56 between the ends 58 and 60 thereof. In FIG. 2, the sampling head 12 is shown in the first or sampling position and in phantom lines in the second or retracted position.

As will be described in detail in connection with the description of FIGS. 6 – 7B, each of the valve blocks 18 and 20 has ports therein for effecting the various connections, described above, when the blocks 18 and 20 are in the sampling position or in the delivery position.

Figure 5:
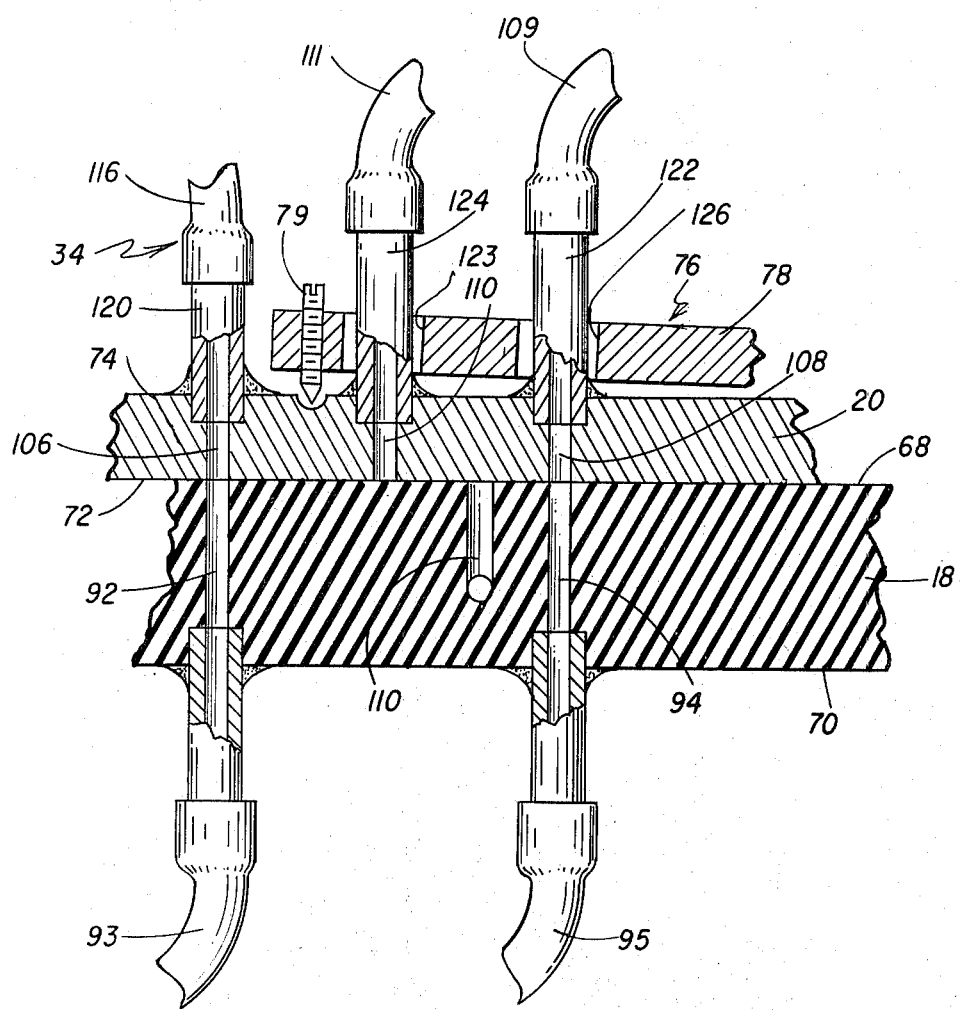
FIG. 5 is a fragmentary sectional view through the sampling head taken generally along the line 5—5 of FIG. 3 and in the indicated direction.

As best shown in FIG. 5, the first block 18 has an inner face 68 and an outer face 70. Likewise, the second valve block 20 has an inner face 72 and an outer face 74. According to the teachings of the present invention, the fluid connections are made and broken at the inner faces 68 and 72 of the blocks 18 and 20 which are held in tight sliding engagement. To provide a good seal between the inner faces 68 and 72 in the areas adjacent the port connections between the blocks 18 and 20, the blocks 18 and 20 are compressively loaded and the inner faces 68 and 72 are ground and lapped. Preferably, the inner faces 68 and 72 are formed from a very hard material which is ground and polished smooth to inhibit, if not prevent, galling of the inner faces 68 and 72. Because of the pressure loading the blocks must be made from a material having high dimensional stability. Also, the material must be highly resistant to corrosion from the fluid passed therethrough. In one embodiment of the invention, the first block 18 is made of graphite and the second block 20 is made of stainless steel with the inner face 72 flame or plasma-sprayed with an aluminum oxide - silicon oxide composition.

Figure 4:
FIG. 4 is a fragmentary sectional view taken along the line 4—4 of FIG. 2 and in the indicated direction.

As best shown in FIG. 2, a linkage mechanism extends between the valve mechanism 16 and the supporting structure 62. The linkage mechanism engages the second block 20 at one end and the supporting structure 62 at the other end and serves a dual purpose. First, the linkage mechanism 76 effects movement of the block 20 relative to the block 18 when the arm 56 is swung around the pivot 57 and second, provides the compressive loading which urges the block 20 against the block 18. With respect to the latter, the linkage mechanism 76 includes an elongated flat bar 78 which functions as a cantilever spring arm. The bar 78 has pivot members 76 adjustable screwed therein at one end thereof with the pointed ends of members 79 engaged in sockets in the upper or outer surfaces 74 of the second block 20 as best shown in FIG. 5 and the other end of the bar 78 has a suitable threaded aperture in which is received a screw-threaded pivot member 80. The pivot member 80 pivotally engages the supporting structure 62. The bar 78 is positioned between the plane of the outer face 74 of the second block 20 and a roller 82 (FIGS. 2 and 4) which is mounted between the plates 64 and 66 and functions as a rolling fulcrum. The roller 82 is in pressure-engagement with the bar 78 and the pressure can be adjusted by turning the pivot member 80 to move the end thereof toward and away from the bar 78. The pressure exerted by the roller 82 is transmitted in cantilever fashion through the bar 78 by way of pivot members 79 against the block 20 to urge the same against the block 18 and in this manner maintain the desired sealing engagement between the inner faces 68 and 72 of the blocks 18 and 20. The roller 82 also permits easy movement of the bar relative to the roller. In this respect, when the arm 56 is moved upwardly, the bar 78 is moved upwardly, also sliding slightly, and the roller 82 rolls along the upper surface of the bar 78 all the while maintaining pressure on the bar 78.

As shown in FIG. 2, the block 20 is longer than the block 18. Movement of the block 20 relative to the block 18 is precisely limited by stop members 84 and 86 secured respectively to the ends of the block 20 in position to engae the ends of the block 18. Thus, when the arm 56 is moved downwardly by the cylinder 26, movement of the arm 56 is limited by engagement of the stop member 84 with one end of the valve block 18. Likewise, when the arm 56 is moved upwardly by the cylinder 26, movement thereof is limited by engagement of the stop member 86 with the other end of the block 20. The positions of engagement between the stop members 84 and 86 and the respective ends of the block 20 also define the first and second valve positions of the valve mechanism 16.

Figure 6:
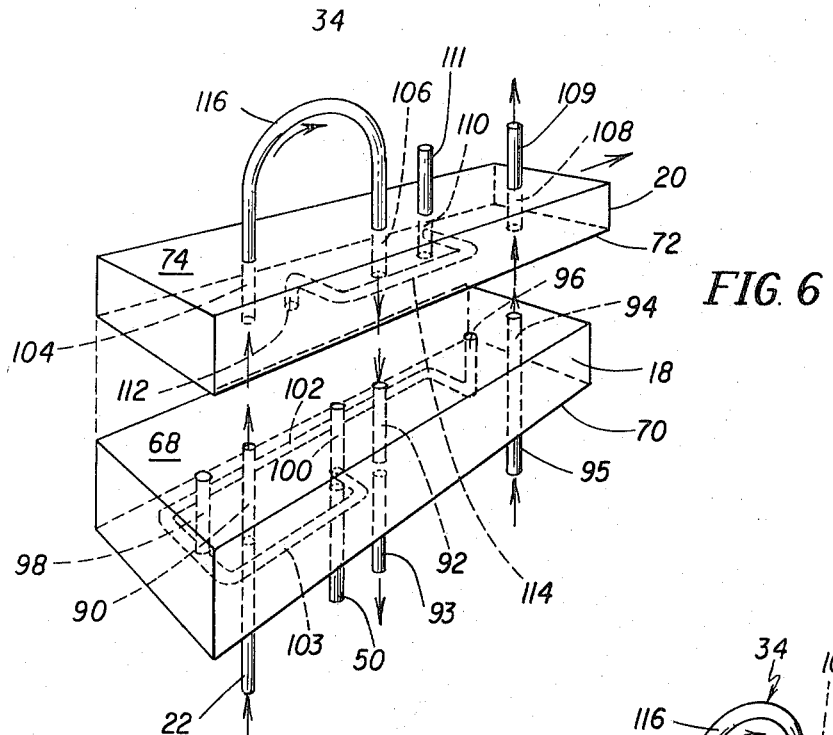
FIG. 6 is a diagrammatic view illustrating the relationship between the two valve blocks of the sampling head at a first or sampling position.

Turning now to FIG. 6, the first valve block 18 has a number of galleries and passageways therein which are identified as follows: a sample pickup passageway 90 extending between the faces 68, 70 of the block 18 and connected at the outer face 70 to the aspirating probe 22; a sample extraction passageway 92 extending between the faces 68, 70 and connected at the outer face 70 to a tube or conduit 93 leading to the sample pump 36; a reagent supply passageway 94 extending between the faces 68, 70 and connected at the outer face 70 to a conduit 95 leading to the source 40 of reagent; a first reagent transfer passageway 96 opening only to the inner face 68; a second reagent transfer passageway 98 also opening only to the inner face 68; a sample delivery passageway 100 extending between the faces of the block 18 and connected at the outer face 70 to the conduit 50; a gallery 102 connecting the first transfer passageway 96 with the second transfer passageway 98; a shunt gallery 103 connecting the gallery 102 with the sample delivery passageway 100.

The second block 20 also has a number of passageways and a gallery therein which are identified as follows: first and second passageways 104 and 106 which extend between the faces 72, 74 of the block 20 and which form part of the sample loop 34; a reagent delivery passageway 108 which extends between the faces 72, 74 of the block 20 and which is connected at the outer face 74 to a conduit 109 leading to the reagent pump 42; a first evacuation passageway 110 extending between the faces of the block 20 and connected at the outer face to a conduit 111 leading to the source 54 of scavenge vacuum; a second evacuation passageway 112 which opens only to the inner face 72; and a gallery 114 connecting the first evacuation passageway 110 with the second evacuation passageway 112.

The passageways all extend normal to the faces of the blocks 18, 20 and preferably are located on the longitudinal centerline of each block 18, 20.

In FIG. 6, the valve blocks 18, 20 are in the first or sample position. In this position, the port of the sample pickup passageway 90 is aligned and in communication with the port of the first passageway 104 of the sample loop 34, the port of the second passageway 106 being aligned and in communication with the sample extraction passageway 92 connected by the conduit 93 to the pump 36. At this time, the programming device 14 has operated the valve 38 to cause the pump 36 to extract or aspirate some of the sample fluid from the sample cup 24 through the probe 22. The sample fluid is drawn part way into the conduit 93 but not into the pump 36 because the pump 36 is of the displaceable diaphragm type, with limited volume movement. Also, at this time, the reagent supply passageway 94 is aligned and in communication with the reagent delivery passageway 108 and the valve 44 has been operated by the device 14 to cause reagent pump 42 to draw a quantity of reagent from the reagent source 40 into the pump 42.

After a predetermined time as determined by the programming device 14, the valve 28 is actuated to operate the cylinder 26 to move the sampling head 12 to the second or delivery position. At the same time the valves 38 and 44 are actuated to reverse the operations of the pumps 36 and 42 so that in the second valve position which is shown in FIGS. 7A and 7B the pumps 36 and 42 urge fluid toward the valve mechanism 16.

It will be appreciated that when the valve blocks 18, 20 are moved relative to each other as the valve mechanism 16 is moved to its second position, the port openings of the first and second passageways 104 and 106 of the sample loop 34 at the inner face 72 at the block 20 are sheared so as to trap a given volume of sample in the sample loop 34.

Figure 7A:
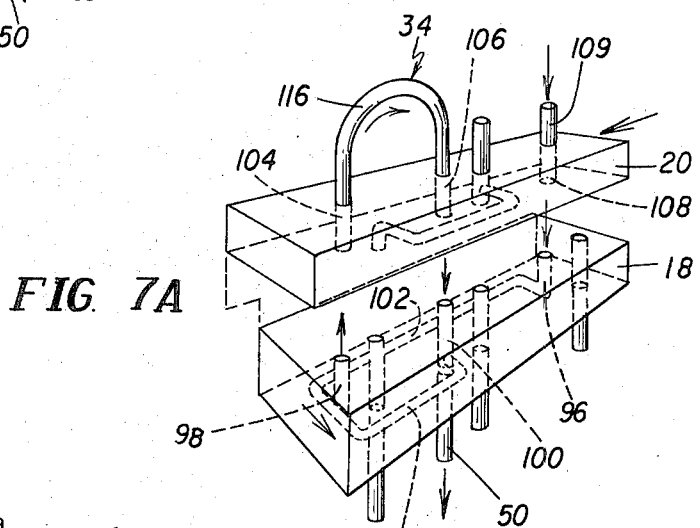
FIGS. 7A and 7B are diagrammatic views similar to that of FIG. 6 but illustrating the valve blocks in a second or mixing and delivering position.
Figure 7B:
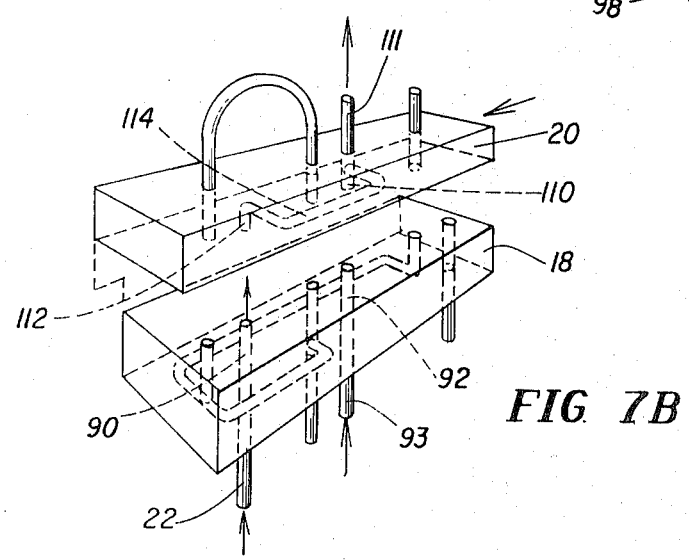

In the second position of the valve mechanism 16 and as shown in FIG. 7A, the reagent delivery passageway 108 is now aligned and in communication with the first reagent transfer passageway 96. At the same time, the second reagent transfer passageway 98 communicates with the first passageway 104 of the sample loop 34, i.e., communicates with the inlet port of the sample loop 34; and the second passageway 106 of the sample loop 34, i.e., the outlet port of the sample loop 34, communicates with the sample delivery passageway 100.

Preferably, the shunt gallery 103 which extends between the second reagent transfer passageway 98 and the sample delivery passageway 100 has a different cross section (diameter) than the sample loop 34. In this respect, the sample loop 34 preferably has a smaller cross section than the shunt gallery 103 so that a fraction of the reagent flows through the sample loop 34 rejoining the major reagent stream at the junction of the shunt gallery with the sample delivery passageway 100. At this junction the sample material is intermingled with the reagent stream so that the fluid emerging from the end of the delivery tube 50 comprises a mixture of sample and reagent. It is to be noted that the shunt gallery 103 has three functions.

First, it avoids passing the entire reagent stream through the sample loop 34. Since the loop 34 is of smaller cross section than the gallery 102, the loop 34 presents a higher impedance to fluid flow. However, the shunt gallery 103 prevents an undesirable high impedance to the flow of reagent through the sample loop 34 by providing a bypass or shunt for the flow of reagent.

Second, the proportions of the reagent passing through the shunt gallery 103 and the sample loop 34 are controlled by the relative sizes of the sample loop 34 and the shunt gallery 103. By proper selection of the cross section (diameter) of the shunt gallery 103 relative to the cross section of the sample loop 34, one can produce optimum intermingling of sample and reagent at the junction of the shunt gallery 103 with the sample delivery passageway 100.

Third, by minimizing the flow of reagent through the sample loop 34, damage to fragile elements such as blood cells in the sample material is avoided. In this respect, the relatively gentle flow of fluid through the shunt gallery minimizes damage to those elements which could be caused by high stream velocities and turbulent flow in a "straight through" system.

At the same time that reagent is being mixed with the sample and is forcing the sample into the delivery conduit 50, the sample pickup passageway 90 and the sample extraction passageway 92 are being evacuated by the scavenge vacuum device 54. In this respect and as best shown in FIG. 7B, the sample pickup passageway 90 is now aligned and in communication with the second evacuation passageway 112 and the sample extraction passageway 92 is now aligned and in communication with the first evacuation passageway 110. Thus, in the second valve position, the scavenge vacuum device 54 extracts or evacuates most of the sample left in the passageway 90 (and the probe 22 connected thereto) and in the extraction passageway 92 (and the conduit 93 connected thereto). Also, the vacuum acting through conduit 93 of pump 36 cooperates with the pressure supplied through valve 38 to pump 36 to return the same to its extracting position. As a result, the sampling head 12 will be ready to pick up another sample when it is moved back to its first position.

The port opening of each passageway at the outer face 72 or 74 of the respective valve block 18 or 20 is counter bored to receive an end of a metal pipe which is secured therein with an epoxy cement. Some of these connections are shown in FIG. 5. Except for the one pipe defining the probe 22, the pipes are cut short to form suitable quick-connect-disconnect fittings for detachably receiving thereon the ends of plastic tubings defining the various conduits.

As best shown in FIG. 2, the sample loop 34 includes a length of such tubing which is detachably connected to two of the fittings which are identified with reference numerals 118 and 120 and which are secured to the outer face 74 of the second block 20 and in communication respectively with the passageways 104 and 106. Since the ends of the length 116 of tubing are merely pressed onto the fittings 118, 120, the volume of the sample loop 34 can be changed very easily merely by changing the length 116 of tubing.

As shown in FIG. 5, two of the fittings, namely, the fittings which are identified with reference numerals 122 and 124 and which form respectively, extensions of passageways 108 and 110 for detachably connecting conduits 109 and 111 thereto, extend respectively through openings 126 and 128 in the bar 78. The openings 126 are larger than the fittings 122 and 124 to permit movement of the bar 78 laterally of and relative to the fittings 122 and 124 during movement of the sampling head 12 between its two positions.

When the probe 22 is inserted into the liquid sample within the sample container 24, capillary action of the liquid causes a meniscus to form about the outer surface of the probe. Then when the probe 22 is withdrawn from the liquid sample, the adhesion, cohesion and surface tension in the liquid meniscus causes some of the liquid sample to cling to the outer surface of the probe 22 and to form a drop at the end of the probe 22 which is quickly sucked up into the probe 22. The drop is usually formed as the probe 22 breaks away from the surface of the liquid sample in the sample container 24. However when the probe 22 is withdrawn at a fairly rapid speed, liquid clings to the outer surface and flows downwardly by gravity to form a drop at the end of the probe 22 at a time after the probe 22 breaks away from the surface of the liquid. The drop normally is sucked up by the scavenging action before the probe 22 is inserted into a subsequent sample container.

Of course the faster the speed of withdrawal, the quicker the operation of the whole apparatus of which the sampling head 12 is a part. It will be appreciated, however, that if the speed of withdrawal of the probe 22 is very fast, a larger amount of fluid will be picked up on the outer surface of the probe 22 and it will take longer for all of the liquid to flow downwardly to the lower end of the probe 22 to be sucked into the probe 22. In fact all of the liquid picked up by the probe may not be sucked into the probe and wiping of the probe to prevent contamination or carry over into the next sample could become necessary for very fast speeds of withdrawal.

From empirical tests it has been determined that the amount of liquid which clings to the outer surface of the probe is directly related to the rate of withdrawal of the probe from the liquid sample. In this respect, rapid withdrawal of the probe leaves a substantial amount of liquid clinging thereto while very slow withdrawal leaves virtually no liquid on the outer surface of the probe. Although it is not known with absolute certainty, it is believed that this phenomena is caused by the rate of relative movement between the meniscus and the probe. In other words, by controlling the relative rate of movement, the meniscus can be caused to recede on the probe without breaking. If it does not break, it leaves no liquid on the outer surface of the probe.

According to the teachings of the present invention the probe 22 is withdrawn at a maximum speed which results in minimum pickup of liquid sample on the outer surface of the probe 22.

Of course the optimum rate of withdrawal of a probe from a liquid in order to avoid surface contamination from the probe when it is inserted in another liquid also depends upon both the nature of the liquid and the nature of the probe surface.

For a metal probe with a smooth outer surface, e.g., a stainless steel probe, and an aqueous solution, empirical tests have shown that a speed of withdrawal no greater than one-half (½) inch per second results in minimum clinging of fluid to, or pickup of fluid by, the outer surface of the probe when it is withdrawn from an aqueous solution.

In FIG. 8 is illustrated a modified form of sampling head 129 which has a construction enabling it to be mounted with a plurality of like sampling heads 121 for simultaneous operation therewith. The sampling head 129 includes a mechanism 130, similar to the valve mechanism 16, including a first or lower valve block 131 and a second or upper valve block 132. A sampling probe 133 is fixed to and extends from the lower valve block 131 and is positioned for movement into an out of a sample container 134 for aspirating a quantity of sample from the sample container 134 through a sample loop 135. The valve blocks 131 and 132 are substantially the same as the valve blocks 18 and 20 and function in substantially the same way. The ports and valve connections within the valve assembly 130 are essentially identical to the port and valve connections in the valve assembly 16 shown in FIGS. 1–7B.

The valve assembly 130 is supported at one end of an arm assembly 136 defined by two rectangular elongated plates 138 and 140. As shown, the valve block 131 is secured to and between the outer ends of the plates 138 and 140 by suitable fasteners.

The fasteners utilized in securing the arm plates 138 and 140 to the valve block 131 are also utilized to secure two thin plates 142 and 144 to the valve block 131. In this respect each plate 142, 144, is situated between the valve block 131 and one of the arm plates 138, 140. Since each of the plates 142, 144 is identical, only one plate will be described in detail. As shown, the thin plate 142 extends upwardly to a point above the valve block 132 and a portion of the plate is folded over to form a rectangular slot adjacent to an upper edge of the valve block 132. Each end of the slot is closed with a tab which extends from a side edge of the thin plate 142. Within each of the slots are inserted a plurality of balls or ball bearings 146. According to the teachings of the invention the height of the slot between the upper surface of the valve block 132 and the portion of the thin plate forming the top side of the slot is of a dimension which is slightly less than the diameter of the balls 146 so that there is an interference or friction fit of the balls 146 within the slot. In this way the balls 146 exert pressure on the block 132 forcing it against the block 131, and provide for rolling and sliding friction between the balls 146 and the upper surface of the valve block 132 during relative movement between the valve blocks 131 and 132. With this arrangement sufficient pressure is applied to the valve assembly 130 to hold the valve blocks 132 and 131 in tight, but slidable, face-to-face engagement.

In the modified sampling head 121, the inner ends of the plates 138 and 140 are secured to a block 150 which has a semicylindrical recess 152 which fits about a cylindrical shaft 154. The cylindrical shaft 154 has a plurality of threaded bores 156 therein, each of which is adapted to received a threaded fastener, such as the fastener 158 shown in FIG. 9, for securing one of the arm assemblies 136 to the shaft 154. For this purpose the block 150 has a counterbored passageway 160 which extends into the block 150 at an angle from the upper face of the block 150 and opens onto the cylindrical recess 152.

The shaft 154 extends through and is journalled in a side wall 162 of a housing partially surrounding the sampling heads 129, and is connected on the other side of the wall 162 to a lever arm 164. A distal end 166 of the lever arm 164 is connected to a piston rod 168 of a suitable piston and cylinder mechanism 170. The piston and cylinder mechanism 170 is secured to the side wall 162. It will be apparent that reciprocation of the piston rod 168 will produce limited rotation of the shaft 154 to cause upward or downward movement of the sampling head 129 and the probe 133. A portion of the sampling head 129 in the raised position is shown in phantom in FIG. 8.

The housing also includes a back wall 172 and the shaft 154 is spaced from and extends parallel to the back wall 172. An elongate bar 174 is fixed to the back wall 172 and juts outwardly from the back wall 172 toward the shaft 154. The elongate bar 174 is spaced above the shaft 154 and has a plurality of openings 176 each of which is generally aligned with one of the bores 156 in the shaft 154. Each of the openings 176 is adapted to receive and have secured therein a stud member 178 having a ball end 180. Each ball end 180 forms part of a ball and socket connection 182 for pivotally mounting one end of a linkage 184 extending from and connected to the upper valve block 132 of one of the sampling heads 129.

Each linkage 184 includes a rod 186 adjustably and threadably connected to a socket member 188 of one of the ball and socket connections 182. The other end of the rod member is received in and pivotally connected to a cup-shaped member 190. A pivot pin 192 extends through the sides of the cup-shaped member 190 and through the rod 186. To prevent sliding movement of the rod 186 on the pin 192 preferably an elastomeric material is inserted into the cup-shaped member 190 around and about the rod 186 and the pin 192. The cup-shaped member 190 is connected to a box-shaped, lost motion and energy absorbing framework 192 which is secured to and spaced from the inner end of the valve block 132 by a suitable fastener. A desired spacing between the framework 192 and the valve block 132 is obtained by means of a spacer 193 received over the fastener. The framework 192 includes two leaf springs 194 and 196 which are connected together at each end by a fastener and held spaced apart by spacers 198 and 200 respectively. It will be noted that the cup-shaped connecting member 190 is connected to the leaf spring 194 at a point below the midpoint of the leaf spring 194 and that the leaf spring 196 is connected essentially at its midpoint to the inner end of the valve block 132.

The valve block 120 has stop members 202 and 204 connected respectively to each end thereof and positioned to engage respective opposite ends of the valve block 131 thereby to limit relative movement between the blocks 131 and 132. In this way, proper alignment of the ports in the respective blocks 131 and 132 is obtained when the coupling head 129 is in either its raised position or its lowered position.

It is to be appreciated that only by maintaining unnecessarily strict manufacturing tolerances for the various parts of the sampling head can a plurality of sample heads 129 have exactly the same dimensions. Thus, practical structures will vary. In this respect the lengths of the valve blocks 131 or 132 may differ and, to ensure engagement between the stop member 202 (or 204) and the lower valve block 131 of each valve assembly 129 when each of the valve assemblies 129 is rotated the same distance on the shaft 154, some means must be provided for allowing slight overtravel between the arm assembly 136 and the linkage 184. The framework 192 provides such means in that once the stop 202 engages the valve block 131, continued relative movement between the linkage 184 and the arm assembly 136 will only result in bending of one or both of the leaf springs 194, 196, thereby providing for lost motion.

The balls 146 bearing down on the valve block 120 create friction forces which tend to resist movement of the block 132 relative to the block 131. As a result, when any force is applied to the inner end of the block 120 to move the same relative to the block 131, the friction forces reacting against this force create a force tending to buckle or urge the valve block 132 upwardly. To minimize these buckling forces, the block 132 and the rod 186 preferably are asymetrically connected to the framework 192. For this reason, the rod 186 is connected to the leaf spring 194 at a point below the midpoint thereof and below the extension of the upper valve block axis passing through the point at which the upper valve block 132 is connected to the leaf spring 196. In this way the framework 192 and the asymetrical connections thereto counterbalance and absorb angular and lost motion forces.

It will be apparent from the foregoing description that obvious modifications and variations can be made to the sample pickup and mixing apparatus of the present invention and the novel sampling head thereof without departing from the spirit and scope of the invention. For example, the apparatus 10 can be used for diluting a sample in which case the source 40 is a source of diluent. Accordingly, the scope of the invention is only to be limited as necessitated by the accompanying claims.

What it is desired to secure by Letters Patent of the United States is:

1. A sampling head for use at a sample pickup station, said head comprising a hollow sample pickup probe adapted to be inserted into a sample container at a sample pickup station for extracting a given amount of fluid sample from the container, said pickup probe being movable between a first or sampling position and a second or retracted position, valve means operable upon movement of said probe to said sampling position for connecting said probe to means for withdrawing fluid from the sample container through said probe, means for moving said probe and simultaneously operating said valve means whereby said valve means is operated by said moving means to connect said probe to the withdrawing means at the same time said probe is moved by said moving means to said sampling position, and arm means fixed to a rotatable shaft for supporting said sample pickup probe and said value means spaced from the shaft, said moving means being operatively connected to the shaft.

2. A sampling head for use at a sample pickup station, said head comprising a hollow sample pickup probe adapted to be inserted into a sample container at a sample pickup station for extracting a given amount of fluid sample from the container, said pickup probe being movable between a first or sampling position and a second or retracted position, valve means operable upon movement of said probe to said sampling position for connecting said probe to means for withdrawing fluid from the sample container through said probe, means for moving said probe and simultaneously operating said valve means whereby said valve means is operated by said moving means to connect said probe to the withdrawing means at the same time said probe is moved by said moving means to said sampling position, arm means mounted to a supporting structure for supporting said sample pickup probe and said valve means spaced from the supporting structure, said arm means being mounted for rotation about an axis, said valve means including first and second valve blocks each having at least one passageway therein, said arm means including spaced apart plate portions, said first block being secured to and between said plate portions, said second block being movably mounted between said plate portions adjacent and in sliding contact with said first block, said plate portions forming a guideway for said second block preventing lateral movement thereof relative to said first block, and means for urging said second block against said first block, said plate portions extending upwardly above and being folded over said second block to form a slot defining part of said urging means and said urging means including a plurality of balls received in said slot, the height of said slot above the upper surface of said second block being less than the diameter of each of said balls to provide a tight fit of said balls in said slot.

3. A sampling head for use at a sample pickup station, said head comprising a hollow sample pickup probe adapted to be inserted into a sample container at a sample pickup station for extracting a given amount of fluid sample from the container, said pickup probe being movable between a first or sampling position and a second or retracted position, valve means operable upon movement of said probe to said sampling position for connecting said probe to means for withdrawing fluid from the sample container through said probe, means for moving said probe and simultaneously operating said valve means whereby said valve means is operated by said moving means to connect said probe to the withdrawing means at the same time said probe is moved by said moving means to said sampling position, and arm means mounted to a supporting structure for supporting said sample pickup probe and said valve means spaced from the supporting structure, said arm means being mounted for rotation about an axis, said valve means including first and second valve blocks each having at least one passageway therein, said first block being secured to said arm means and said second block being movably mounted on and in sliding contact with said first block between first and second valve positions, said sampling head including a linkage mechanism having first and second ends, said first end of said linkage mechanism engaging said second block and said second end of said linkage mechanism engaging part of the supporting structure whereby, when said first block is moved, said linkage mechanism causes said second block to move relative to said first block and between said valve positions, said second end of said linkage mechanism including a ball and socket connection to the said part of the supporting structure.

4. A sampling head for use at a sample pickup station, said head comprising a hollow sample pickup probe adapted to be inserted into a sample container at a sample pickup station for extracting a given amount of fluid sample from the container, said pickup probe being movable between a first or sampling position and a second or retracted position, valve means operable upon movement of said probe to said sampling position for connecting said probe to means for withdrawing fluid from the sample container through said probe, means for moving said probe and simultaneously operating said valve means whereby said valve means is operated by said moving means to connect said probe to the withdrawing means at the same time said probe is moved by said moving means to said sampling position, arm means mounted to a supporting structure for supporting said sample pickup probe and said valve means spaced from the supporting structure, said arm means being mounted for rotation about an axis, said valve means including first and second valve blocks each having at least one passageway therein, said first block being secured to said arm means and said second block being movably mounted on and in sliding contact with said first block between first and second valve positions, said sampling head including a linkage mechanism having first and second ends, said first end of said linkage mechanism engaging said second block and said second end of said linkage mechanism engaging part of the supporting structure whereby, when said first block is moved, said linkage mechanism causes said second block to move relative to said first block and between said valve positions, stop means for limiting relative movement between said valve blocks, and lost motion and energy absorbing means in said linkage mechanism for permitting overtravel in the relative movements between said arm means and said linkage mechanism after movement between said valve blocks has been stopped by said stop means.

5. The sampling head as claimed in claim 4 wherein said lost motion and energy absorbing means include a box-shaped framework including two generally upright leaf springs, one leaf spring being connected generally at its midpoint to the inner end of said second valve block and in spaced apart relationship thereto, and said linkage mechanism includes a rod connected between said other leaf spring and the said part of the supporting structure.

6. The sampling head as claimed in claim 5 wherein said rod is connected to said other leaf spring at a point below the midpoint of said other leaf spring thereby to minimize angular forces on said second valve block.

7. A sampling head for use at a sample pickup station, said head comprising a hollow sample pickup probe adapted to be inserted into a sample container at a sample pickup station for extracting a given amount of fluid sample from the container, said pickup probe being movable between a first or sampling position and a second or retracted position, valve means operable upon movement of said probe to said sampling position for connecting said probe to means for withdrawing fluid from the sample container through said probe, and means for moving said probe into the fluid sample in the container and simultaneously operating said valve means whereby said valve means is operated by said moving means to connect said probe to the withdrawing means at the same time said probe is moved by said moving means to said sampling position, and for withdrawing said probe from the fluid sample at a maximum speed which results in minimum pickup of fluid sample on the outer surface of the probe.

8. The apparatus according to claim 7 wherein said means for inserting and withdrawing said probe are operable to withdraw said probe from the fluid sample at a speed no greater than one-half inch per second.

9. A sampling head for use at a sample pickup station, said head comprising a hollow sample pickup probe adapted to be inserted into a sample container at a sample pickup station for extracting a given amount of fluid sample from the container, said pickup probe being movable between a first or sampling position and a second or retracted position, valve means including a sample metering channel and being operable upon movement of said probe to said sampling position for connecting said probe to means for withdrawing fluid from the sample container through said probe and through said sample metering channel, being operable during movement of said probe between said sampling position and said retracted position to trap a metered amount of fluid sample in said sample metering channel, and being operable upon movement of said probe to said retracted position to combine the metered amount of fluid with a quantity of another fluid and simultaneously to transfer the combined fluids to a receptacle, and means for moving said probe and simultaneously operating said valve whereby said valve means is operated by said moving means, first to connect said probe to the withdrawing means at the same time said probe is moved by said moving means to said sampling station, second to trap a metered amount of fluid sample in said sample metering channel while said probe is being raised and third to combine the metered amount of fluid with a quantity of another fluid and simultaneously to transfer the combined fluids to a receptacle at the same time said probe is moved to said retracted position.

* * * * *

UNITED STATES PATENT OFFICE
CERTIFICATE OF CORRECTION

Patent No. 3,858,450      Dated January 7, 1975

Inventor(s) ALAN RICHARDSON JONES

It is certified that error appears in the above-identified patent and that said Letters Patent are hereby corrected as shown below:

Column 4, line 45, delete "not" and substitute -- now --.

Column 4, line 63, delete "aned" and substitute -- and --.

Column 6, line 24, delete "engae" and substitute -- engage --.

Column 10, line 1, delete "121" and substitute -- 129 --.

Column 10, line 49, delete "121" and substitute --129--.

Signed and Sealed this twenty-ninth Day of July 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

PATENT NO. : 3,858,450
DATED : January 7, 1975
INVENTOR(S) : ALAN RICHARDSON JONES It is certified that error appears in the above-identified patent and that said Letters Patent are hereby corrected as shown below:

In the "Notice", change June 26, 1990 to July 24, 1990.

Column 12, line 4, delete "120" and substitute -- 132 --.

Signed and Sealed this ninth Day of September 1975

[SEAL]

Attest:

RUTH C. MASON
Attesting Officer

C. MARSHALL DANN
Commissioner of Patents and Trademarks